Patented June 2, 1942

2,284,970

UNITED STATES PATENT OFFICE 2,284,970

METHOD OF GROWTH CONTROL AND CARRIER

George S. Avery, Jr., New London, Conn., assignor to The Dow Chemical Company, Midland, Mich., a corporation of Michigan No Drawing. Application May 23, 1940, Serial No. 337,111

13 Claims. (Cl. 47—58)

This invention relates to the regulation of the development of an abscission layer in growing plants by treatment with an auxin, and more especially to a carrier for the auxin which upon drying will form a protective coating so as to insure that the auxin will be absorbed by the plant. The present application is a continuation-in-part of copending application Serial No. 104,543, filed October 7, 1936.

It is well known that, at various stages in the growth of plants, abscission layers tend to form. The formation of these layers causes the abscission of buds (bud drop), leaves, flowers and fruit. Abnormally early development of abscission layers is frequently prejudicial to the normal development of the plant and is economically undesirable. Among the causes of such abnormal behavior are unfavorable climatic conditions, reduced rainfall, and the like.

For example, it has been found that, where the temperature in the winter time does not fall to a necessary minimum, there often occurs a failure of the buds to develop in certain varieties of plants, and sometimes there is abscission of a high percentage of flower and leaf buds on fruit trees, such as the apricot and peach. Climatic and other conditions also cause premature leaf and fruit drop. The regulation of these conditions is very important in view of large losses suffered annually by the fruit grower.

Herbaceous plants, such as greenhouse grown sweet peas, are also subject to bud abscission and leaf drop which prevent the normal development of the plants. The regulation of this condition is important.

As disclosed in my co-pending application, Serial No. 336,658, filed May 22, 1940, now U. S. Patent No. 2,220,505, the formation of this abscission layer can be regulated by applying an auxin to the trunk, branches, leaves, flowers, or fruits of growing plants at a time substantially in advance of the period in which the abscission layer would normally be expected to develop. Either a spray or dusting technique may be employed in applying the auxin to the plant. The use of sprays has been found particularly satisfactory, a simple solution or dispersion of the auxin being adequate for this purpose.

The auxins employed may be auxin A, auxin B, heteroauxin (3-indoleacetic acid), or similar plant auxins; they may be used either in the chemically pure form, or as an impure plant extract, or an impure extract from urine or other animal materials.

The term "auxin" includes those substances which cause an enlargement of the plant cell as distinguished from those substances that cause plant growth by supplying nutrient to the plant. In addition to auxin A and B and heteroauxin, the influence of acids, such as alpha-naphthalene acetic, 3-indole butyric, 2-carboxy-3-indole butyric, indole propionic, phenylacetic, fluorene acetic, anthracene acetic, and naphthyl acetonitrile, upon plant cell enlargement is well known. The term "auxin" in the claims is inclusive of the substances disclosed above as well as other and related materials capable of exerting the desired action upon plant growth, particularly those containing a naphthalene, naphthalenoxy, phenyl, phenoxy, indole, and other aromatic and aromaticoxy groupings as well as the ethers, esters, amides, and substitution products of the acid derivatives heretofore mentioned. The term does not include substances which are merely plant stimulants or substances, such as ammonia or ethylene, which have undesirable volatility.

As is taught in the previously mentioned copending application, the auxin material is applied to the plant surface at a time, usually from one day to three weeks in advance of the period when the buds, leaves, flowers or fruits might be expected to absciss. The auxin can be applied as a spray by simply dissolving or dispersing the required amount of auxin in water. This may be accomplished either by adding the auxin, a solution thereof in water miscible organic solvent, or a water soluble salt of the auxin to the required amount of water to obtain a solution or dispersion of the active material. Similarly the auxin may be incorporated into dust compositions, any of the common finely divided carriers being suitable provided they do not react with or on the auxin so as to destroy its effectiveness.

The present invention embraces the idea of providing a carrier of a type which will hold the auxin in contact with the plant. I have found that the best carrier, upon drying, should possess the property of forming a flexible, water insoluble coating so as to protect the auxin, and enable the plant to absorb the latter at a constant and continuous rate until the supply of auxin is exhausted. The dried coating of the carrier-auxin mixture should also be at least semi-permeable so as to permit the "breathing" of the plant and not to interfere with normal plant metabolism. The carrier must also be of a type which is compatible with the auxin.

In practice, any type of emulsion, dried residues of which have these characteristics, would be satisfactory as a carrier. I have found that aqueous dispersions comprising a waxy material are especially suitable. In preparing such compositions, the wax may be melted and the proper proportion of auxin mixed therewith, after which the mixture may be compounded in any suitable manner to obtain the desired aqueous dispersion. If desired, however, the auxin may simply be added to any compatible wax containing water-dispersible composition.

A representative composition in which the auxin may be incorporated consists of wax dispersed in aqueous emulsion with a suitable emulsifying agent, such as soap. Such an emulsion may be obtained by dispersing a wax, such as carnauba wax, in the amount of from about 5 to 25 per cent of the composition in an aqueous solution of soap. Sodium oleate and triethanolamine oleate are suitable as emulsifying agents and may be used in amounts of from 1 to 8 per cent. Soaps prepared from other bases, such as potassium hydroxide and ammonia, and other fatty acids, such as linoleic acid, may also be used. The following example is given to illustrate a carrier of this type:

| | Per cent |
|---|---|
| Carnauba wax | 23 |
| Sodium and triethanolamine oleate | 5.8 |
| Water | 71.2 |

The above emulsion may be made as follows:

A mixture of 125 parts of carnauba wax is mixed with 22 parts of oleic acid at 85–90° C. A solution is made up of 1 pound of caustic soda and 10 pounds of triethanolamine in 30 pounds of water, and the solution is heated to 90° C. This solution is stirred ino the wax-oleic acid mixture at the same temperature and thoroughly mixed to form a jelly-like mass. To this mass water at a temperature of 90° C. is slowly added until a total weight of 125 pounds is reached. The product is an emulsion suitable as a protective carrier for the auxin and, if desired, may be further diluted with water to control the thickness of the coating. Other waxes, such as candelilla, beeswax, paraffin and ceresin may be substituted in whole or in part for the carnauba. As most auxins are heat stable, the auxin may be added at any point in the procedure.

The ratio of wax to fatty acid in the emulsion may be varied to some extent. Variations in the composition and percentage of the emulsifying agent affect the surface tension of the emulsion and the water repellancy of the film resulting from the use of the emulsion.

The formation of the soap emulsifier internally in the solution, i. e. (in situ), while in intimate commixture with the material to be emulsified, produces a very effective emulsion. Moreover, it is sometimes advantageous to add to the emulsions alkali metal or the ammonium salts of casein, or gums or resins. such as as rosin, shellac, pontianak gum, in amounts of from 5 to 40 per cent of the amount of wax used.

It is preferable that the organic acid from which the soap is formed in the foregoing compositions be a free fatty acid or a mixture of free fatty acids rather than a fatty acid glyceride. The presence of the latter results in the formation of glycerol which is not a desirable component of my new compositions.

While any of the alkaline hydroxides, carbonates and borates, as well as organic bases, can be employed as described above to produce the emulsifying soap, it has been found that the alkali metal borate, borax ($Na_2B_4O_7.10H_2O$), is very satisfactory. Any free fatty acid from which a soap satisfactory as an emulsifying agent can be made, such as oleic, stearic, palmitic and linoleic acid, may be used.

The waxes which may be used include mineral waxes, such as paraffin, ozokerite and Montan, or waxes of vegetable origin, such as carnauba, beeswax and candelilla. Also mineral oil may be incorporated with the wax if desired. The following examples are illustrative of suitable carrier materials:

| | Per cent (by wt.) |
|---|---|
| Beeswax | 15 |
| Refined mineral oil | 25 |
| Oleic acid | 1.5 |
| Borax | 1 |
| Water | 57.5 |
| Paraffin wax | 7.5 |
| Refined mineral oil | 25 |
| Stearic acid | 1.5 |
| Borax | 1 |
| Water | 65 |

In preparing the above emulsions, the paraffin, mineral oil and free fatty acid are added together to form a liquid mixture which is brought to a temperature well above the solidifying point of its waxy constituent. The water with the borax dissolved therein, also heated to approximately the same temperature, is then run into the hot wax-oil-acid mixture with vigorous agitation which produces a milky emulsion that is thinly fluid at ordinary room temperatures and above. The borax and free fatty acid which are in substantially combining proportions react in situ to form a soap which acts as the emulsifying agent. If desired, an additional quantity of water can be added to thin the emulsion. The auxin may be added at any point in the procedure.

After the emulsion is applied to the plant, it dries to provide a substantially uniform film-like waxy protective coating which is not sticky or tacky, and adheres to the treated surface. At the same time, this coating is gas permeable to such an extent that it does not entirely prevent or unduly interfere with the "breathing" or transpiration so essential to the continued well-being of the plant. The refined mineral oil specified in the foregoing formulae may be omitted, in which case the percentage of paraffin should ordinarily be reduced substantially.

As a preferred carrier for the auxin, an aqueous emulsion consisting of wax and a colloidal earth may be employed, whereby a permeable film is formed. The auxins are given up slowly to the plant and are prevented from being washed away by rains at such a rapid rate as to prevent their desired action. In one method of preparation, the colloidal earth is made into a suspension in hot water and molten wax is added to the mixture when the latter is at a temperature which is above that of the melting point of the wax. The wax is added with constant stirring and a good emulsion is obtained. After cooling the emulsion, the auxins are added and the material is then in condition for being sprayed on the plants. The preferred concentration of auxin used in this and the subsequently described emulsions comprise 3 parts of an auxin, such as alpha-naphthalene acetic acid, incorporated in a million parts by weight of emulsion.

A good spray can be obtained by employing approximately 3 parts of colloidal earth, 20 parts of water, 10 parts of wax and 3 parts of the ammonium salt of a drying acid and diluting the whole with approximately 80 parts of water. A very good carrier can be formed of 6 parts by weight of paraffin wax, 4 parts by weight of beeswax, 3 parts of a colloidal earth, 3 parts of the ammonium salt of a drying acid and 10 to 15 parts of water. The term "ammonium salt of a drying acid" refers to unsaturated fatty acids having two or more double bonds in the structural formula. These fatty acids may be derived from drying oils, such as fish oil, soya bean oil, lumbang, sardine, linseed, perilla, tung and so forth. The colloidal earth may be fuller's earth or similar clays, but preferably bentonite.

To obtain the composition the ammonium salt of the drying acid is dissolved in hot water; the suspension of a colloidal earth in hot water is accomplished separately; the solution and the suspension then are mixed, and to this mixture is added the molten wax at a temperature above that of the melting point of the wax. Constant stirring should take place until a good emulsion is formed, and this should continue until the mixture is cool. The auxin may be then added. Though since most auxins are heat stable they can be added before the cooling.

The wax employed is preferably paraffin wax, but others can be used, such as carnauba, beeswax, etc.

Another mixture which I have found to be satisfactory as a carrier is that employing ammonium linoleate by weight 3 parts dissolved in 50 parts of hot water. Three parts of bentonite is made into a suspension with 50 parts of the hot water. The solution and the suspension are then added together and while the mixture is above the melting point of paraffin, 10 parts of molten paraffin are poured into the mixture with vigorous stirring, and the emulsion allowed then to cool to room temperatures while continuously stirring.

The proportion of auxin added to the carrier depends to some extent upon the type of carrier selected, the type of plant to be treated, and the climatic conditions. Generally, however, except where otherwise specified in this application, the auxin is added in a concentration within a range of from 1 to 10 parts of auxin to 300,000 parts by weight of the carrier. This figure is not meant to be limiting, but I have found that too high concentration of the auxin is undesirable.

The emulsion or mixture of carrier and auxin is applied to the plant in any suitable manner. For example, the mixture may be applied by rubbing or dipping, although preferably a carrier is employed which can be applied by spraying. After application to the plant, the carrier rapidly forms a flexible coating which protects the auxin and permits the plant to absorb the material until the supply is exhausted.

While certain embodiments of my invention have been disclosed, it is to be understood that I am to be limited only by the appended claims and the showing of the prior art, and that I am entitled to the equivalents of the steps taken and the substances used.

I claim:

1. As a new composition of matter, a water-dispersible wax, emulsion containing an auxin in low concentration, residues of which emulsion dry to form a flexible, weather-resistant semi-permeable coating over surfaces with which they are contacted.

2. As a new composition of matter, an aqueous emulsion comprising a mixture of an auxin and a wax, said auxin being in low concentration and dispersed throughout the wax.

3. As a new composition of matter, a water-dispersible emulsion comprising a low concentration of an auxin, a waxy carrier and an emulsifying agent, the dried residues of said emulsion being insoluble in water, flexible, weather-resistant and semi-permeable.

4. As a new composition of matter, a water-dispersible emulsion comprising a mixture of an auxin, wax, and a colloidal earth, said auxin being in low concentration, and dried films of said emulsion being insoluble in water, tough, flexible, weather-resistant, and semi-permeable.

5. As a new composition of matter, a water-dispersible emulsion comprising a mixture of a wax, a colloidal earth, and an auxin in an amount not greater than 10 parts by weight per 300,000 parts of the composition.

6. A method of preventing the abscission of a part of a growing plant comprising treating the plant with an aqueous emulsion composition comprising an auxin and a wax-containing carrier at a time substantially in advance of the period when the part might be expected to be abscised.

7. A method of preventing the abscission of a part of a growing plant comprising treating the plant with an emulsion, said emulsion comprising an auxin incorporated in a carrier of wax and colloidal earth in the proportions of not more than 10 parts by weight of auxin to 300,000 parts of carrier at a time substantially in advance of the period when the part might be expected to be abscised.

8. A method of preventing abscission of buds comprising treating the buds with an aqueous emulsion composition comprising an auxin and a wax at a time substantially in advance of the normal period at which the buds are expected to open.

9. A method of preventing the abscission of a part of a growing plant comprising treating the plant with an aqueous emulsion comprising a wax and an auxin at a time substantially in advance of the period when the part might be expected to be abscised, said emulsion residues forming a weather-resistant film over the treated portions of the plant which is sufficiently permeable to permit the plant to absorb the auxin.

10. As a new composition of matter an aqueous emulsion comprising a low concentration of an auxin embodying the naphthalene group, a waxy carrier, and an emulsifying agent, the dry residues of such emulsion being insoluble in water, flexible, weather-resistant, and semi-permeable.

11. As a new composition of matter an aqueous emulsion comprising a low concentration of an auxin embodying the indole group, a waxy carrier, and an emulsifying agent, the dry residues of such emulsion being insoluble in water, flexible, weather-resistant, and semi-permeable.

12. A method of preventing the abscission of a part of a growing plant comprising treating the plant with an aqueous emulsion composition comprising a wax and an auxin embodying the naphthalene group at a time substantially in advance of the period when the part might be expected to be abscised.

13. A method of preventing the abscission of a part of a growing plant comprising treating the plant with an aqueous emulsion composition comprising a wax and an auxin embodying the indole group at a time substantially in advance of the period when the part might be expected to be abscised.

GEORGE S. AVERY, Jr.